(12) United States Patent
Caron

(10) Patent No.: US 7,712,588 B2
(45) Date of Patent: May 11, 2010

(54) TEMPERATURE BASED CLEARANCE CONTROL FOR VEHICLE BRAKE

(75) Inventor: LaVerne A. Caron, Kalamazoo, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1066 days.

(21) Appl. No.: 11/401,134

(22) Filed: Apr. 10, 2006

(65) Prior Publication Data
US 2007/0235268 A1    Oct. 11, 2007

(51) Int. Cl.
F16D 66/02    (2006.01)

(52) U.S. Cl. .................. 188/1.11 L; 188/71.9; 188/71.7

(58) Field of Classification Search ............ 188/1.11 R, 188/1.11 E, 71.6, 71.7, 71.8, 71.9, 156, 157, 188/158, 159, 160, 161, 162, 1.11 W, 1.11 L; 303/20
See application file for complete search history.

(56) References Cited

U.S. PATENT DOCUMENTS

| | | | |
|---|---|---|---|
| 4,402,047 A * | 8/1983 | Newton et al. ................. | 303/20 |
| 5,372,221 A | 12/1994 | Jalbert | |
| 5,641,042 A | 6/1997 | Maeda | |
| 6,217,131 B1 | 4/2001 | Schanzenbach | |
| 6,464,308 B2 | 10/2002 | Kubota | |
| 7,458,442 B2 * | 12/2008 | Kolberg ................... | 188/1.11 E |
| 2004/0011596 A1 | 1/2004 | Miller | |
| 2005/0029858 A1 * | 2/2005 | Forster et al. ................. | 303/20 |
| 2006/0090968 A1 * | 5/2006 | Taylor et al. ............ | 188/1.11 L |
| 2009/0114488 A1 * | 5/2009 | Bailey et al. ............ | 188/1.11 E |

FOREIGN PATENT DOCUMENTS

| | | |
|---|---|---|
| EP | 0903514 A1 | 9/1997 |
| EP | 1318933 | 9/2001 |
| EP | 1186495 A1 | 3/2002 |
| GB | 2266568 A * | 11/1993 |
| JP | 2001260866 A * | 9/2001 |
| WO | WO 96/41969 | 12/1996 |
| WO | WO 02/13043 A1 | 2/2002 |

* cited by examiner

Primary Examiner—Thomas J Williams
(74) Attorney, Agent, or Firm—Carlson, Gaskey & Olds

(57) ABSTRACT

An adjustment mechanism for a vehicle brake uses an electric motor to adjust brake clearance based on brake temperature and wheel speed. A temperature sensor transmits brake temperature data to a controller. If a brake is dragging during non-braking events, the controller identifies an increase in brake temperature and actuates the electric motor to increase brake clearance. The controller also adjusts brake clearance to accommodate for brake wear. When wheel speed is above a predetermined speed value, the controller actuates the electric motor to move a non-rotating brake component toward a rotating brake component until a predetermined temperature increase is sensed. Once the predetermined temperature increase is identified, the electric motor moves the non-rotating brake component away from the rotating brake component to provide an optimized brake clearance.

18 Claims, 2 Drawing Sheets

TEMPERATURE BASED CLEARANCE CONTROL FOR VEHICLE BRAKE

TECHNICAL FIELD

An adjustment mechanism for a vehicle brake utilizes an electric motor and controller to optimize brake clearance based on brake temperature and wheel speed.

BACKGROUND OF THE INVENTION

Vehicle brakes include adjustment mechanisms that adjust brake clearance, which comprises a distance between a brake pad and a rotating brake rotor when the vehicle brake is not applied. A minimum brake clearance is required such that brake pads do not drag against the brake rotor. As brake pads wear, the brake clearance increases, which can adversely affect the capability of the vehicle brake to achieve maximum brake torque. To compensate for this an adjustment mechanism is used to move the brake pads toward the brake rotor as the pad wears.

One type of known adjustment mechanism utilizes a mechanical adjustment system that operates in a manner similar to that of a clutch with a known amount of backlash. One disadvantage with this type of system is that if over-adjustment occurs, then the brakes drag. This decreases the overall life of the brake pads.

Another type of adjustment mechanism utilizes electric adjusters to adjust brake clearance. Typically these systems mimic the existing mechanical adjustment mechanism. These types of systems are often complex, expensive, and time consuming to install. Thus, there is a need for a simplified and cost-effective adjustment system that optimizes brake clearance, and which can adjust for brake wear as well as brake drag.

SUMMARY OF THE INVENTION

An adjustment mechanism for a vehicle brake uses an electric motor to optimize brake clearance. A controller controls the electric motor to adjust brake clearance based on brake temperature and wheel speed. An increase in brake temperature during non-braking events signifies brake drag, and once brake drag is identified, the controller actuates the electric motor to increase brake clearance. The controller also adjusts brake clearance to accommodate for brake wear. During a specified adjustment cycle, when wheel speed is above a predetermined speed value, the controller actuates the electric motor to optimize brake clearance.

In one example, the vehicle brake assembly includes a set of pads that are engaged against a rotating brake rotor during a braking event. If drag is identified, the controller actuates the electric motor to move the set of pads away from the rotating brake rotor. To accommodate for pad wear, if wheel speed is greater than the predetermined speed value, the controller actuates the electric motor to move the set of brake pads toward the rotating brake rotor until a predetermined temperature increase is sensed. Once the predetermined temperature increase is identified, the electric motor moves the non-rotating brake component away from the rotating brake component by a certain amount to provide an optimized brake clearance.

The subject invention provides a simple, effective, and reduced cost method and apparatus for optimizing brake clearance. These and other features of the present invention can be best understood from the following specification and drawings, the following of which is a brief description.

DETAILED DESCRIPTION OF THE PREFERRED EMBODIMENT

Figure 1:
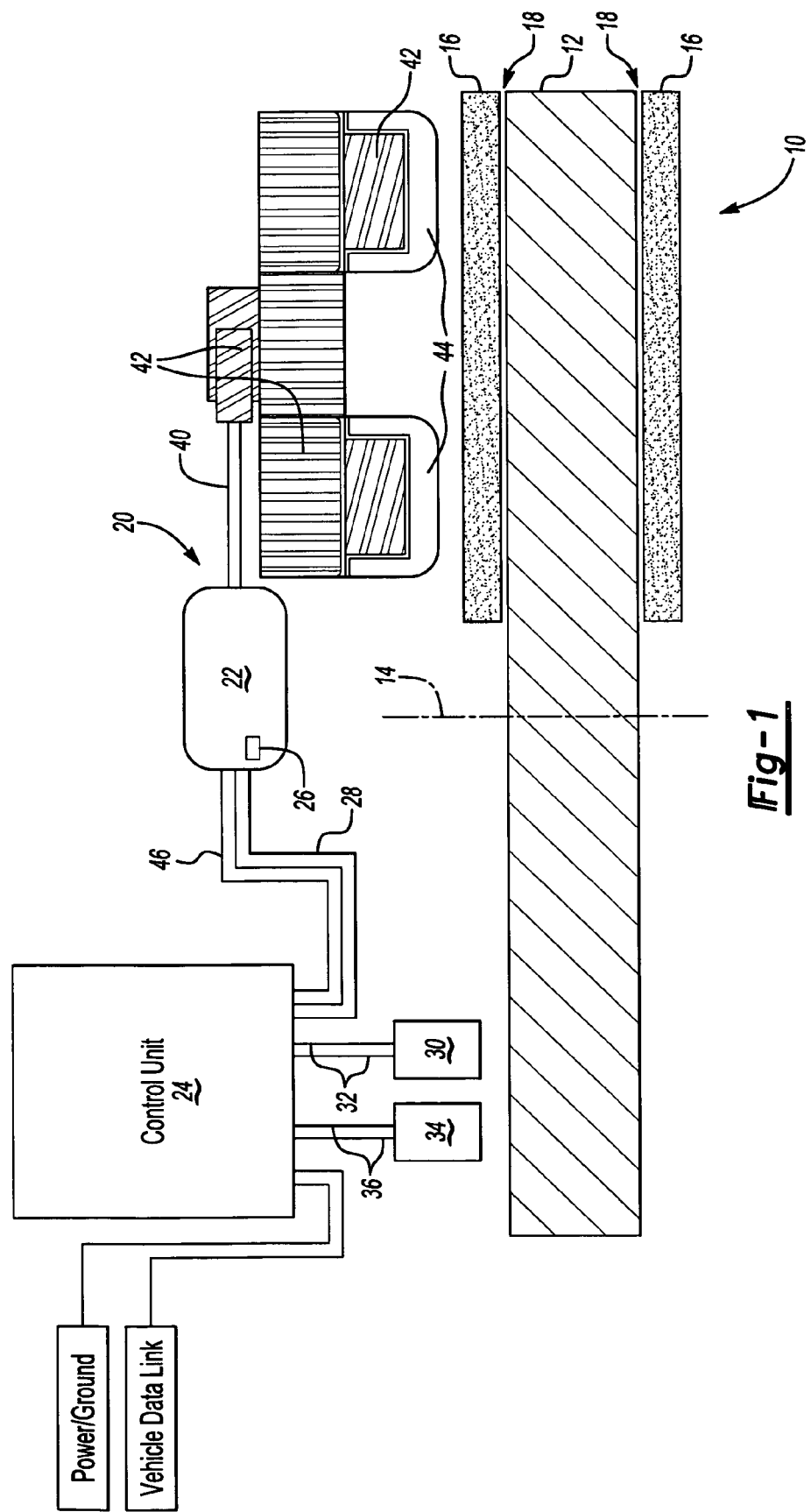
FIG. 1 is a schematic representation of a vehicle brake assembly and associated adjustment mechanism incorporating the subject invention.

As shown in FIG. 1, a vehicle brake 10 includes a rotor 12 that rotates about an axis 14. Brake pads 16 are mounted to a non-rotating vehicle structure (not shown), and are spaced by a clearance shown generally at 18 from the rotor 12 when the vehicle brake 10 is not applied.

An adjustment mechanism 20 that operates according to the subject invention is used to optimize the clearance 18 to accommodate both pad wear and brake drag. While the vehicle brake 10 shown in FIG. 1 comprises a disc brake, it should be understood that the adjustment mechanism 20 and method of operating the adjustment mechanism 20 could also be used with other types of vehicle brakes.

The adjustment mechanism 20 includes an electric motor 22 that is operated by a control unit or controller 24. The controller 24 includes a power/ground connection interface and a vehicle data link, as indicated in FIG. 1. The electric motor includes a position sensor 26 that monitors motor position as known. Motor position data is communicated to the controller 24 via a motor signal 28. The controller 24 compiles and tracks motor rotation data from the motor signal 28 to estimate the amount of clearance and to provide pad wear information to an operator.

A temperature sensor 30 measures and monitors the temperature of at least one brake component. Preferably, the temperature sensor 30 measures the temperature of the rotor 12 and/or brake pad 16. The temperature sensor 30 generates a temperature signal 32 that communicates brake temperature data to the controller 24. A single brake temperature sensor can be used to measure the temperature of either the rotor 12 or brake pad 16, or separate temperature sensors could be used for each of the brake pad 16 and rotor 12. The sensor is shown schematically and would be positioned in an appropriate location to sense the temperature.

A wheel speed sensor 34 measures and monitors wheel speed. The wheel speed sensor 34 generates a wheel speed signal 36 that communicates wheel speed data to the controller 24.

The electric motor 22 includes a motor output shaft 40 that drives a gear reduction 42. The gear reduction 42 drives a set of tappets 44 that are associated with the brake pads 16. Under predetermined/specified conditions, the controller 24 generates a control signal 46 to actuate the electric motor 22 to adjust clearance 18 by driving the gear reduction 42 and tappets 44. The electric motor 22 can be used to increase or decrease the clearance 18 between the rotor 12 and pads 16. A connection between pads 16 and tappets 44 may be as known, and is not shown here for purposes of clarity. Further, any type of known gear reduction can be used to drive the tappets 44. The controller 24 determines which type of adjustment is needed based on various factors, such as brake temperature and/or wheel speed, for example. This will be discussed in greater detail below.

Figure 2:
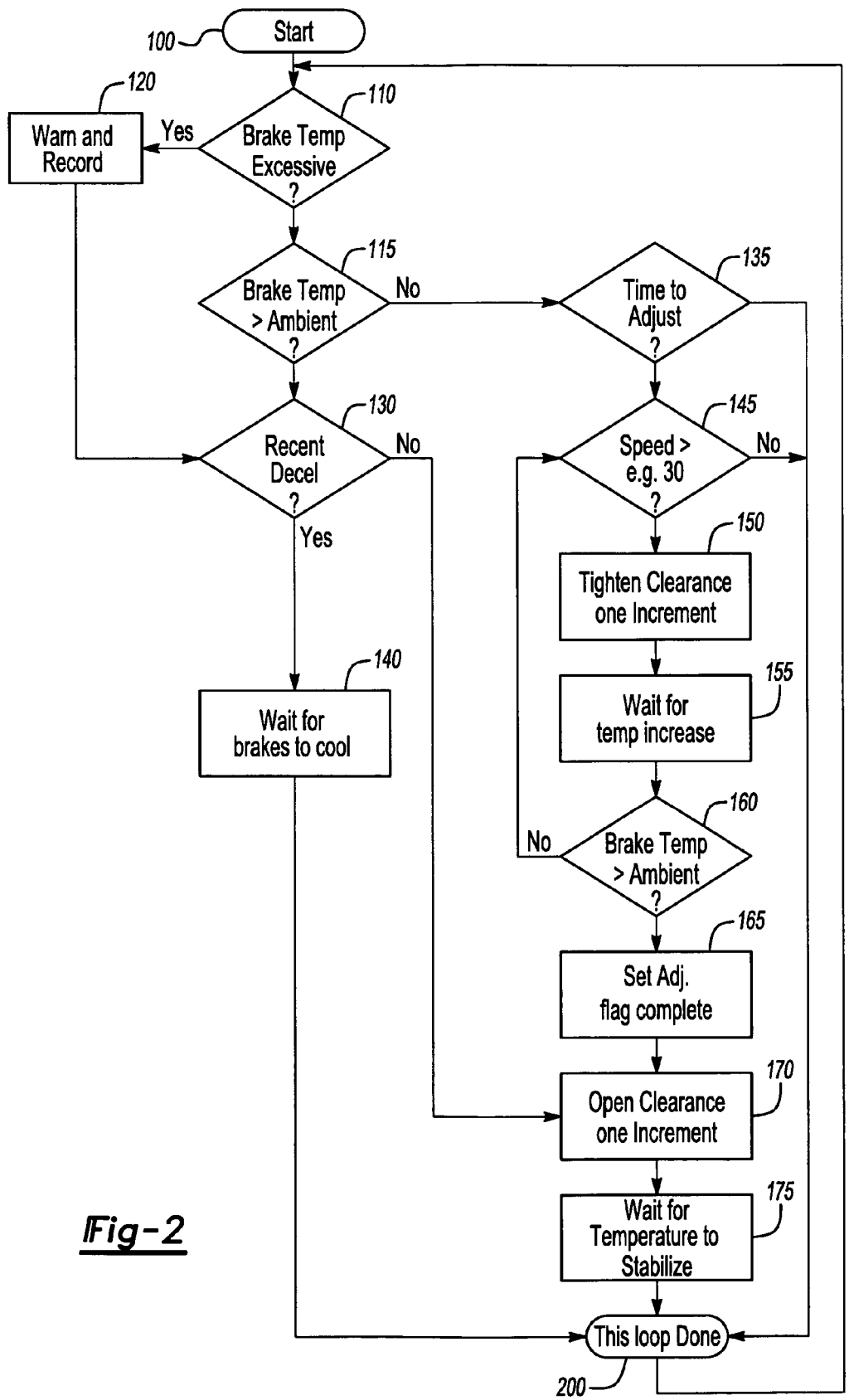
FIG. 2 is a flow chart describing a method of brake adjustment incorporating the subject invention.

FIG. 2 depicts a flowchart that sets forth the steps for adjusting clearance with the adjustment mechanism 20. A closed-loop process is initiated at a start 100. The controller 24 then determines if a measured brake temperature is excessive at step 110. An excessive temperature level is typically a temperature at which a significant brake problem potentially exists. If an excessive brake temperature does exist, the controller 24 issues a warning and records the event at step 120.

After such a warning is issued, the controller 24 then determines if a deceleration that would be indicative of a recent braking event has occurred at step 130. This can be accomplished by looking at the derivative of the wheel speed. If a recent deceleration event is identified, the controller 24 waits for the brakes to cool as indicated at 140 and finishes a loop cycle as indicated at 200. Thus, if an excessive temperature is identified in combination with a recent deceleration, the adjustment mechanism 20 is not used to adjust clearance. The controller 24 waits until the brakes have cooled before determining whether adjustment of clearance is needed in a subsequent loop cycle.

If during step 110, the controller 24 determines that there is not an excessive brake temperature, the controller then compares a measured brake temperature to a predetermined temperature level as indicated at 115. In one example, the predetermined temperature level is ambient temperature, however, other temperature levels could also be used.

A separate sensor could be used to measure ambient temperature. Or, ambient temperature could be defined as a temperature point where it is known that the brakes have not been applied, e.g. vehicle start-up, and/or after a long period of time has passed without a deceleration. It is also known that ambient temperature lies within a relatively narrow range, which is well below typical brake operating temperatures. Thus, it would be possible to consider any temperature above thirty-five degrees Celsius, for example, to be above ambient. Finally, it is also possible to look at the absolute temperature and the derivative of the temperature, i.e. is the temperature increasing or decreasing, to make a determination as to whether the brake temperature is above ambient. For diagnostic purposes it is also useful to compare temperatures from one side of a vehicle to an opposite side of the vehicle. However, a data link is required for this type of information comparison.

If, during step 115, it is determined that the measured brake temperature is greater than the predetermined temperature level, the controller determines whether a recent deceleration has occurred as described above with regard to step 130. If a recent deceleration is identified, the controller 24 performs steps 140 and 200 as described above.

If the measured brake temperature is greater than the predetermined temperature level and there has not been a recent deceleration, the controller then determines whether or not it is time to perform an adjustment as indicated at 135. Adjustment times can be determined/defined in many different ways. For example, the time to adjust could be once per a certain predetermined number of vehicle stops. Or, the time to adjust could be once per a predetermined time interval, such as once per day, for example. Or, the time to adjust could be made dependent on deceleration level, i.e. time of deceleration and temperature reached during deceleration. It should be understood that these are just examples and that other methods could be used to determine whether or not it is time to perform a brake adjustment.

If the controller 24 determines that it is not time to perform an adjustment, then the loop cycle is completed as indicated at 200. If the controller 24 determines that it is time to perform an adjustment, then the controller determines whether measured wheel speed is greater than a predetermined speed value as indicated at 145. Preferably, the predetermined speed level is approximately thirty miles per hour, however, other speeds could also be used. A higher speed will result in more rapid and higher brake temperature increase making determination of brake pad contact easier. However the speed chosen must not be so high that the vehicle operates below the chosen speed for long periods of time. If the measured wheel speed is not greater than the predetermined speed value, then the loop cycle is completed as indicated at 200.

If the measured wheel speed is greater than the predetermined speed value and the measured brake temperature is less than the predetermined temperature level, then the controller 24 activates the electric motor 22 to move the brake pad 16 toward the rotor 12, i.e. clearance 18 is tightened. Preferably, clearance is tightened by one increment as indicated at 150. One increment comprises a discrete, predetermined distance value. After clearance 18 has been tightened by one increment, the controller 24 waits to see if there is an increase in brake temperature as indicated at 155.

After a predetermined time interval, the controller 24 compares the current measured brake temperature to the predetermined temperature level, which in the example discussed, is ambient temperature. This step is indicated at 160. If the measured brake temperature is not greater than the predetermined temperature level, then the controller 24 returns to step 145 to determine whether wheel speed is above the predetermined speed value. If it is, the controller activates the motor to tighten clearance 18 by one more increment. The controller repeats steps 145 through 160 until the current measured brake temperature is greater than the predetermined temperature level.

Once the current measured brake temperature is greater than the predetermined temperature level, then the controller 24 sets an adjustment flag—adjustment complete, as indicated at 165. Then the controller 24 opens clearance 18, i.e. increases clearance 18 by one increment as indicated at 170. This provides an optimized, minimum clearance between the brake pads 16 and rotor 12, which keeps braking response fast and provides optimum, high brake torque.

Once the clearance 18 has been opened, the controller 24 waits for measured brake temperature to stabilize as indicated at 175. Then the loop cycle is completed as indicated at 200. The subject method is a closed loop system, thus, once a loop cycle is completed 200, the controller returns to the start 100 and performs a subsequent loop cycle.

The adjustment mechanism 20 also avoids the problem of over adjustment. Over adjustment causes brake drag. When the brakes are subjected to brake drag, the brakes run hot and have increased wear rates, which results in reduced fuel economy. To identify and eliminate brake drag, the controller performs steps 100-130 as described above. If during step 130, the controller 24 determines that there has not been a recent deceleration, but the current measured brake temperature is above the predetermined temperature level, the controller proceeds to step 170. As described above, during step 170 clearance 18 is opened by one increment. The controller 24 then proceeds with steps 175-200 as described above.

The subject invention provides a method and apparatus for optimizing brake clearance in response to brake drag and brake wear. The subject invention is simpler than existing mechanical and electrical systems with better performance. The subject invention provides a simple closed loop approach that assures minimum clearance without risking the possibility of dragging brakes. Further, if brake temperature is being monitored for diagnostic purposes, only one additional component is needed, i.e. an electronic actuator. Either current feedback from the motor, or alternatively, a position/speed sensor on the motor output shaft 40 may be desirable to optimize control and enhance diagnostics.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for adjusting clearance between a rotating brake component and a non-rotating brake component comprising the steps of:
   (a) monitoring a temperature of a brake component to provide a measured temperature;
   (b) comparing the measured temperature to a predetermined temperature level; and
   (c) adjusting brake clearance by
      (1) moving the non-rotating brake component away from the rotating brake component if the measured temperature is above the predetermined temperature level, and including determining if there was a recent deceleration when the measured temperature is above the predetermined temperature level, and waiting a predetermined time interval for the brake component to cool before adjusting brake clearance if a recent deceleration is identified, and
      (2) moving the non-rotating brake component toward the rotating brake component if the measured temperature is below the predetermined temperature level and wheel speed is above a predetermined speed value.

2. The method according to claim 1 including adjusting brake clearance at least one time per a predetermined time interval.

3. The method according to claim 1 including adjusting brake clearance after each occurrence of a predetermined number of vehicle stops.

4. The method according to claim 1 including specifying adjustment intervals, and if the measured temperature is not above the predetermined temperature level, determining if an adjustment is needed based on the specified adjustment intervals.

5. A method for adjusting clearance between a rotating brake component and a non-rotating brake component comprising the steps of:
   (a) monitoring a temperature of a brake component to provide a measured temperature;
   (b) comparing the measured temperature to a predetermined temperature level;
   (c) adjusting brake clearance by
      (1) moving the non-rotating brake component away from the rotating brake component if the measured temperature is above the predetermined temperature level, and
      (2) moving the non-rotating brake component toward the rotating brake component if the measured temperature is below the predetermined temperature level and wheel speed is above a predetermined speed value;
   (d) monitoring a wheel speed to provide a measured speed;
   (e) comparing the measured speed to the predetermined speed value; and
   (f) adjusting brake clearance during step (c) (2) by moving the non-rotating brake component toward the rotating brake component if the measured temperature is not greater than the predetermined temperature level and if the measured speed is greater than the predetermined speed value.

6. The method according to claim 5 wherein the predetermined temperature level is ambient temperature and the predetermined speed value is at least thirty miles per hour.

7. The method according to claim 5 including
   (g) repeating step (f) until the measured temperature increases to a specified temperature level.

8. The method according to claim 7 including
   (h) moving the non-rotating brake component away from the rotating brake component by a predetermined amount subsequent to step (g).

9. The method according to claim 8 wherein each time step (f) is performed, the non-rotating brake component is moved toward the rotating brake component by one predetermined increment.

10. The method according to claim 9 wherein the non-rotating component comprises a brake pad and the rotating brake component comprises a brake rotor and wherein steps (c), (f), and (h) are performed by an electric motor.

11. The method according to claim 10 including providing a gear reduction coupled to drive a set of tappets associated with the brake pad, and driving the gear reduction and set of tappets with the electric motor to adjust the position of the brake pad relative to the brake rotor.

12. A brake assembly comprising:
   a rotating brake component;
   a non-rotating brake component that engages said rotating brake component during braking and is spaced apart from said rotating brake component by a brake clearance during non-braking;
   a temperature sensor that measures a temperature of at least one of said rotating and said non-rotating brake components to provide a measured brake temperature;
   an electric motor that moves said non-rotating brake component relative to said rotating brake component to adjust the brake clearance;
   at least one wheel speed sensor for monitoring wheel speed;
   a controller that controls said electric motor to adjust brake clearance based on said measured brake temperature wherein said electric motor increases brake clearance by moving said non-rotating brake component away from said rotating brake component if said measured brake temperature is greater than a predetermined temperature level during non-braking and wherein said electric motor adjusts brake clearance by moving said non-rotating toward said rotating brake component if said measured temperature level is not greater than said predetermined temperature level and wheel speed is above a predetermined speed value; and
   wherein if the measured temperature is greater than the predetermined temperature level then said controller determines whether it is time to make an adjustment, and wherein once said controller identifies a time to adjust, said controller compares a measured wheel speed to the predetermined speed value to determine whether the adjustment can be made.

13. The brake assembly according to claim 12 wherein said non-rotating brake component comprises a set of brake pads and said rotating brake component comprises a brake rotor.

14. The brake assembly according to claim 12 including a position sensor that monitors motor position and communicates motor data to said controller, and wherein said controller utilizes said motor data to determine an amount of brake wear.

15. A brake assembly comprising:

a rotating brake component;

a non-rotating brake component that engages said rotating brake component during braking and is spaced apart from said rotating brake component by a brake clearance during non-braking;

a temperature sensor that measures a temperature of at least one of said rotating and said non-rotating brake components to provide a measured brake temperature;

an electric motor that moves said non-rotating brake component relative to said rotating brake component to adjust the brake clearance;

a controller that controls said electric motor to adjust brake clearance based on said measured brake temperature wherein said electric motor increases brake clearance by moving said non-rotating brake component away from said rotating brake component if said measured brake temperature is greater than a predetermined temperature level during non-braking and wherein said electric motor adjusts brake clearance by moving said non-rotating toward said rotating brake component if said measured temperature level is not greater than said predetermined temperature level and wheel speed is above a predetermined speed value; and wherein said predetermined temperature level is ambient temperature and said predetermined speed value is at least thirty miles per hour.

16. A brake assembly comprising:

a rotating brake component;

a non-rotating brake component that engages said rotating brake component during braking and is spaced apart from said rotating brake component by a brake clearance during non-braking;

a temperature sensor that measures a temperature of at least one of said rotating and said non-rotating brake components to provide a measured brake temperature;

an electric motor that moves said non-rotating brake component relative to said rotating brake component to adjust the brake clearance; and a controller that controls said electric motor to adjust brake clearance based on said measured brake temperature wherein said electric motor increases brake clearance by moving said non-rotating brake component away from said rotating brake component if said measured brake temperature is greater than a predetermined temperature level during non-braking and wherein said electric motor adjusts brake clearance by moving said non-rotating toward said rotating brake component if said measured temperature level is not greater than said predetermined temperature level and wheel speed is above a predetermined speed value, and wherein said controller determines if a recent deceleration has occurred when said measured brake temperature is greater than said predetermined temperature level, and when a recent deceleration is identified, said controller waits for the brakes to cool prior to determining whether increasing the brake clearance is required.

17. A brake assembly comprising:

a rotating brake component;

a non-rotating brake component that engages said rotating brake component during braking and is spaced apart from said rotating brake component by a brake clearance during non-braking;

a temperature sensor that measures a temperature of at least one of said rotating and said non-rotating brake components to provide a measured brake temperature;

an electric motor that moves said non-rotating brake component relative to said rotating brake component to adjust the brake clearance;

a controller that controls said electric motor to adjust brake clearance based on said measured brake temperature wherein said electric motor increases brake clearance by moving said non-rotating brake component away from said rotating brake component if said measured brake temperature is greater than a predetermined temperature level during non-braking and wherein said electric motor adjusts brake clearance by moving said non-rotating toward said rotating brake component if said measured temperature level is not greater than said predetermined temperature level and wheel speed is above a predetermined speed value; and wherein said electric motor moves said non-rotating brake component toward said rotating brake component by one discrete increment during an adjustment cycle when said measured brake temperature is not greater than said predetermined temperature level and when said wheel speed is above said predetermined speed value, and wherein said controller repeats brake clearance adjustments toward said rotating brake component at discrete increments during said adjustment cycle until said measured brake temperature is greater than said predetermined temperature level and then subsequently adjusts said non-rotating brake component away from said rotating brake component by at least one discrete increment.

18. A method for adjusting clearance between a rotating brake component and a non-rotating brake component comprising the steps of:

(a) monitoring a temperature of a brake component to provide a measured temperature;

(b) comparing the measured temperature to a predetermined temperature level; and (c) adjusting brake clearance by (1) moving the non-rotating brake component away from the rotating brake component if the measured temperature is above the predetermined temperature level, and wherein if the measured temperature is greater than the predetermined temperature level subsequently determining whether it is time to make an adjustment, and wherein once a time to adjust is identified, subsequently comparing a measured wheel speed to a predetermined speed value to determine whether the adjustment can be made and (2) moving the non-rotating brake component toward the rotating brake component if the measured temperature is below the predetermined temperature level and wheel speed is above the predetermined speed value.

* * * * *